Nov. 26, 1963   M. C. VIVIANO   3,111,914
RAVIOLI SEALING AND SEVERING
Filed April 16, 1962
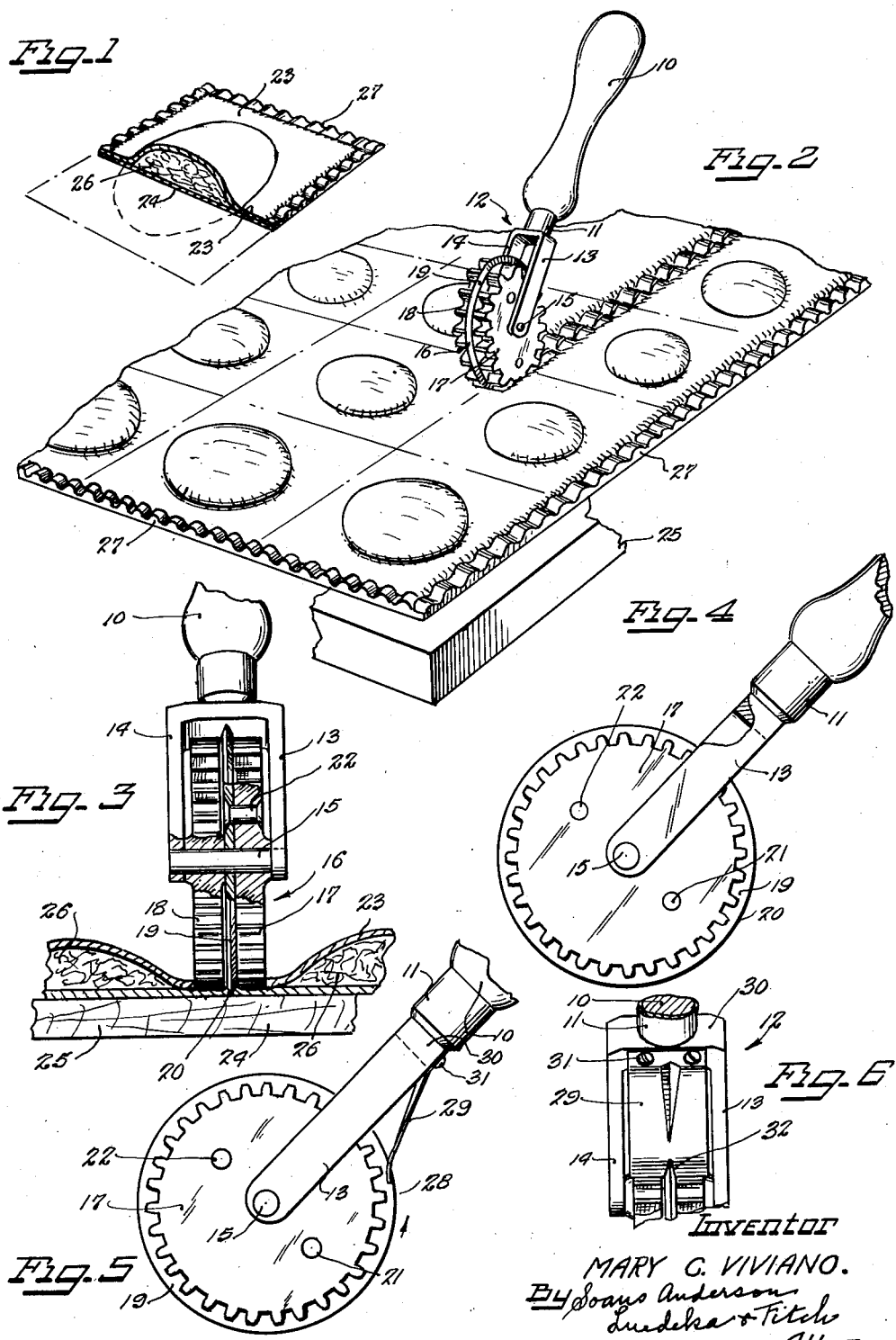
Inventor
MARY C. VIVIANO.
By Soans Anderson
Luedeka & Fitch
Attys

United States Patent Office 3,111,914
Patented Nov. 26, 1963

3,111,914
RAVIOLI SEALING AND SEVERING
Mary C. Viviano, 545 Warren Terrace, Hinsdale, Ill.
Filed Apr. 16, 1962, Ser. No. 187,641
1 Claim. (Cl. 107—47)

The invention relates to the making of the culinary delicacies originated in Italy and known as ravioli.

In general, an Italian ravioli comprises a sandwich like creation comprising an upper and lower sheet of paste or dough between which there is interposed a filling of different kinds but usually involving minced or ground meat, chicken or any other desired food ingredients accompanied by spices or other flavorings. The edges of the sandwich are sealed after insertion of the filling, and the article is then cooked by putting it into boiling water for a limited period.

The basic recipe or formula for making ravioli according to the usual practice will be found in a book by Book Publication Industries Inc. (copyright 1956) and distributed by Culinary Arts Institute in Chicago 1, Illinois, in 1960 or 1961. An acceptable formula for producing the basic noodle dough or pasta is set forth on page 26 of said publication and the formula for two different types of ravioli are set forth on page 27.

The purpose of the present invention is to provide a device and method for enabling a ravioli cook to reduce to a minimum the time and energy involved in the production of the sandwich like articles which are subsequently cooked by the usual methods. At the same time, the use of said new device and method makes it possible to obtain a greater uniformity of final product with a minimum of rejects or waste of materials.

In general, the process used first involves the preparation of a large sheet of ravioli dough which is rolled out the proper thickness (usually about 1/16") on a dough board. The filling has been previously prepared according to the type desired. The portions or dabs of filling, are then spooned out and placed in lengthwise and crosswise rows on the sheet, preferably in a square pattern. The second sheet of dough, which has previously been prepared, is then placed over the first sheet which has the dabs of filling spotted thereon.

Enough space is left between the mounds of filling to allow for the cutting of the sandwich lengthwise and crosswise to form individual squares of sandwich each containing a portion of filling. Contemporaneously with the severing of the individual units from each other, the cut edges of the margins of the upper and lower sheets of each individual unit are pressed together and thus sealed. Said simultaneous separation of the sheets into sections accompanied by the sealing of the edges constitutes an important part of the invention herein disclosed. This result is obtained by a novel type ravioli cutter which device will now be described.

In the drawings accompanying this description there is shown one form of such a device and the manner of using it, which have been successfully used in the making of ravioli in accordance with the invention claimed herein. In said drawings, FIGURE 1 is a perspective view partially in section showing a ravioli made in accordance with the invention, FIGURE 2 is a perspective view of the manner in which said device is operated, FIGURE 3 is a vertical section perpendicular to the direction of movement of the combination sealing and severing device shown in said drawings, FIGURE 4 is a side view of the device in its simplest form, FIGURE 5 is a side elevational view of a modified device equipped with a cleaning attachment and, FIGURE 6 is an end view of the modified device shown in FIGURE 5.

The combination sealing and cutting device shown in FIGURES 2 to 4 includes, as its principal elements, a handle 10 on the lower end of which there is a hub or shank 11 of a bifurcated metal yoke or fork 12 having a pair of depending parallel spaced arms 13 and 14. The lower ends of said arms 13 and 14 are drilled to receive a pin or axle 15, the ends of which are riveted or otherwise secured in the lower ends of said arms.

On the pivot pin or journal 15 there is rotatably mounted a combination slitting or crimping wheel designated as the whole by numeral 16. Said wheel 16 rotates freely on the axle 15 which is secured in the lower ends of the arms 13 and 14. Said wheel 16 includes a pair of spaced pressure rolls, for example, spur gear wheels 17 and 18, between which there is located a rotatable knife or slitter disc 19 of thin steel having the outer periphery thereof sharpened by grinding the same to a fairly sharp edge 20. The teeth of the gears 17 and 18 are of conventional shape and in the case of a wheel diameter of about 2⅛" are 32 in number, with the face about ¼" wide.

In the device, as shown, the spur gear 18 is not keyed to the other parts of the wheel but rotates independently. This is desirable when it might be found necessary to cut a curved slit. However, for purposes of convenient manufacture and assembly, the steel slitter disc 19 is preferably made integral with one of the gears, in this instance 17, by the use of a pair of rivets as indicated at 21 and 22 which are used to unite spur gear 17 and slitter disc 19.

As set forth earlier in the description, the upper and lower sheets 23 and 24 of conventional ravioli paste or dough are made separately in sheets of the same size and large enough to accommodate a batch of 50 or more ravioli units of the customery size. As previously described, the lower sheet 24 is placed on a wooden kneading board 25. The dabs of previously prepared filling 26 are then positioned on the said foundation sheet 24 after which the upper sheet is laid over the first sheet 24 upon which the fillers 26 have been spotted.

It will be observed from an inspection of the drawings that when the device is pressed down on the sheet by the handle 10, and when the handle is pushed forward so as to roll the wheel 16 over the sandwich, two things will occur simultaneously. In the first place, the edge of the slitting disc 19, as best shown in FIGURE 3, will penetrate through both of the plies of paste so as to contact the upper surface of the dough board 25 and thus cut a separation slit in the 2-ply sheet. At the same time, the teeth of the two spur gears 17 and 18 will be pressed down upon the two over-lying margins of the pair of sheets, forcing the same into intimate contact and in effect welding them together.

It should be understood that although gears 17 and 18 are the same external diameter, they are smaller in diameter than the slitter disc 19 so that the edge 20 of the slitter disc 19 will project outwardly beyond the circumference of the spur gear 17 by an amount approximately equal to the thickness of one of the sheets. The result will be that when the slitter disc edge 20 engages the board 25, the 2-ply paste sheet will be slitted or severed while at the same time, the outer faces of the teeth of the spur gears will be forced down through the upper sheet 23 to a depth approximately level with the top of the original surface of the lower sheet 24. Consequently, the sheets will be pressed together so as to seal their contacting marginal surfaces. Also an ornamental corrugated effect as indicated at 27, will be formed by the spur gears 17 and 18. Since the pressure exerted by the spur gear teeth of the gear will be in the direction of movement of the wheel, without significant lateral component, there will be no improper wrinkling or undesirable malformation of the upper surfaces of the margin of the sandwich. This is because the excess dough formed by the compression of the sheet will find room to expand or be forced into the space between the teeth of the gear.

It will be understood that after the outer margins of the sheet have been trimmed, as shown in FIGURE 2, the device is then rolled over the sandwich longitudinally and then crosswise along lines intermediate the rows of the fillers. In this way the sheet will be divided into separate units or sections of ravioli size provided with attractive corrugated borders which not only have considerable eye appeal but constitute an efficient means of sealing. Hence, by the use of the method indicated and the device described and illustrated, a large batch of ravioli can be quickly and efficiently formed and made ready for cooking, with a minimum expenditure of time, energy or waste.

In FIGURES 5 and 6 there is disclosed an attachment which has value in certain cases where, because of the condition of the dough or for any other reason, there might be a tendency of some of the dough to stick to the trailing edge 28 of the wheel as it is rolled over the sandwich. Said device comprises a flat metal plow or scraper arrangement 29 removably secured to the yoke 30 of the fork 12 by screws 31. The lower end of the plow 29 is formed with a V-shaped notch therein as indicated at 32 (see FIGURE 6), so as to cooperate with the outer edge 20 of the slitting disc 19 and scrape off any particles of dough which may adhere to the slitter. However, if the dough is properly made and other conditions are normal, a scraper is not generally required.

A patent is solicited for any and all herein disclosed patentable subject matter invented by applicant.

The embodiment disclosed herein may be changed or modified without departing from the scope of the invention.

Various features now believed to be new and patentable are set forth in the appended claim.

What is claimed is:

A device for producing a number of individual separate sealed units from a multiple-unit sandwich which includes a two-ply sheet of uncooked dough between which plies there are interposed spaced portions of edible filler material, while said sandwich is positioned upon a flat support, which said device comprises, (a) a handle,
(b) a pair of spaced co-axial pressure rolls in the form of spur gears of like diameter mounted axially on said handle and adapted to rotate independently of each other on a substantially horizontal axis,
(c) a circular cutting knife interposed co-axially between said rolls and secured to one of said rolls so as to rotate with it,
(d) said knife having an outer peripheral cutting edge of greater diameter than the outer diameter of the rolls,
(e) whereby the rolling of the device over the sandwich on the support by means of the handle, with sufficient pressure to enable the knife to cut through both sheets, will form a slit between adjacent filler portions for separating the sandwich into adjacent units, and said pressure rolls, will, at the same time, press together those parts of the adjacent marginal zones of the upper and lower plies which extend around the cut edges of the respective units provided by said slit, so as to form a continuous seal between the said marginal zones and around each filler portion.

References Cited in the file of this patent

UNITED STATES PATENTS 2,718,853    Zichichi _____ Sept. 27, 1955